United States Patent [19]
Hillman

[11] Patent Number: 6,021,023
[45] Date of Patent: Feb. 1, 2000

[54] TRANSDUCER SUSPENSION SYSTEM AND METHOD

[75] Inventor: Wesley L. Hillman, Morgan Hill, Calif.

[73] Assignee: International Business Machines Corporation, Armonk, N.Y.

[21] Appl. No.: 09/099,115

[22] Filed: Jun. 17, 1998

[51] Int. Cl.[7] ................................. G11B 5/48; G11B 5/55
[52] U.S. Cl. ............................................ 360/104; 360/106
[58] Field of Search ...................................... 360/104–106

[56] References Cited

U.S. PATENT DOCUMENTS

| | | | |
|---|---|---|---|
| 4,700,250 | 10/1987 | Kuriyama | 360/104 |
| 5,353,183 | 10/1994 | Olson | 360/125 |
| 5,623,759 | 4/1997 | Thorson et al. | 29/603.04 |
| 5,652,684 | 7/1997 | Harrison et al. | 360/104 |
| 5,796,554 | 8/1998 | Berding et al. | 360/104 |
| 5,860,206 | 1/1999 | Tochiyama | 360/104 |
| 5,898,544 | 4/1999 | Krinke et al. | 360/104 |

FOREIGN PATENT DOCUMENTS 6-089498 3/1994 Japan.
6-8241562 9/1996 Japan.

OTHER PUBLICATIONS

TDB—vol. 39 No. 10 Oct. 1996—Integrated Suspension Assembly with Reduced Slider Distortion.

TDB—vol. 39 No. 03 Mar. 1996—Material and Process for Bonding Low–Profile Head Suspension Assemblies to Comb Arms.

*Primary Examiner*—Allen T. Cao
*Attorney, Agent, or Firm*—Douglas R. Millett; Esther E. Klein

[57] ABSTRACT

An actuator arm has a recess portion in its side surface which is positioned vertically during manufacture. A suspension having etched passages is placed next to the actuator arm such that the passages intersect the recess portion. A liquid adhesive is placed in the recess portion which act as an adhesive reservoir. The adhesive is then drawn into the passages and is cured such that the suspension is bonded to the actuator arm.

21 Claims, 3 Drawing Sheets

TRANSDUCER SUSPENSION SYSTEM AND METHOD

BACKGROUND OF THE INVENTION

1. Field of the Invention

This invention relates generally to transducer suspension systems and more particularly to a suspension system which uses an adhesive bond.

2. Description of the Prior Art

Direct access storage devices (DASD), or disk drives, store information on concentric tracks of a rotatable magnetic recording disk. A magnetic head or transducer element is moved from track to track to record and read the desired information. Typically, the magnetic head is positioned on an air bearing slider which flies above the surface of the disk as the disk rotates. In some recently proposed disk drives, the slider (or carrier) rides on a liquid film or bearing on the disk. A suspension assembly connects the slider to a rotary or linear actuator. The suspension assembly provides support for the slider.

Examples of suspension systems are shown in the following references: U.S. Pat. No. 5,652,684, issued Jul. 29, 1997, by Harrison et al; U.S. Pat. No. 5,623,759, issued Apr. 29, 1997, by Thorson et al; U.S. Pat. No. 5,353,183, issued Oct. 4, 1994, by Olson; U.S. Pat. 4,700,250, issued Oct. 13, 1987, by Kuriyama; IBM Technical Disclosure Bulletin Vol. 39, No. 10, Oct. 1996, page 101; IBM Technical Disclosure Bulletin Vol. 39, No. 3, Mar. 1996, page 49; Japanese Patent Application 6-89498 published Mar. 29, 1994 by Shinichi; and Japanese Patent Application 8-241562 published Sept. 17, 1996.

The suspension is attached to an actuator arm of the actuator motor. The actuator motor is used to move the transducer head from track to track on the recording disk. High capacity disk drives typically have a plurality of recording disks arranged in a disk stack. Actuator arms are located between two disks typically having two suspensions attached, one to access the disk surface above and one to access the disk surface below.

One method used to attach a suspension to an actuator arm is swaging. A swage ball is passed through a swage plate rivet located in an aperture of the actuator arm and expands the rivet such that it grips the inside wall. A problem with swaging is that the swage plate rivet adds to the vertical dimension of the arm/suspension assembly. Also, the swage process can impart some unwanted distortions to the actuator and the suspension.

What is needed is a suspension attachment which takes up very little space and does not distort the parts.

SUMMARY OF THE INVENTION

Briefly, in a preferred embodiment of the present invention, an actuator arm is provided with a small notch or recess portion on its side edge. The arm is turned vertically so that the notch is on the top surface. A pair of suspensions are placed on each side of the arm. Each suspension has etched adhesive passageways in the surface facing the arm. The passageways are connected to the notch in the arm.

A liquid adhesive is dispensed into the notch. The notch acts as an adhesive reservoir. The adhesive moves downward from the reservoir through the etched passageways. Capillary effect wicks the adhesive between the surfaces of the arm and the suspensions. A uniform distribution of the adhesive between the arm and the suspensions is achieved. The adhesive is then time cured. The result is an arm/ suspension assembly which can be made to very small dimensions and which does not have unwanted distortions.

For a fuller understanding of the nature and advantages of the present invention, reference should be made to the following detailed description taken in conjunction with the accompanying drawings.

DESCRIPTION OF THE PREFERRED EMBODIMENTS

Figure 1:
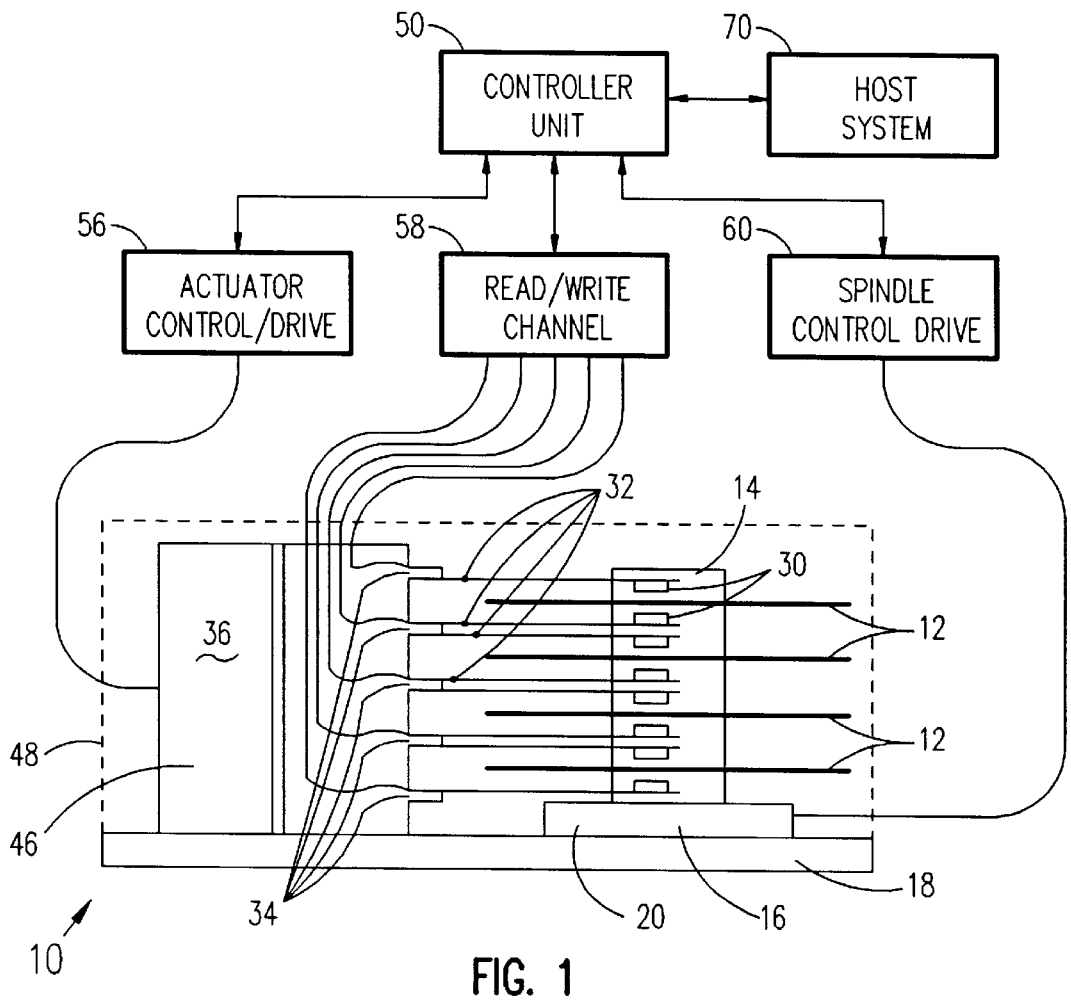
FIG. 1 is a schematic diagram of a data storage system of the present invention.
Figure 2:
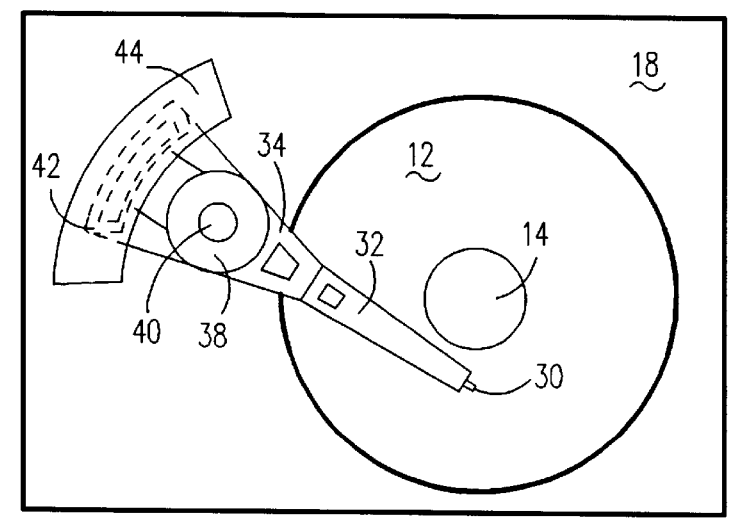
FIG. 2 is a top view of the system of FIG. 1.

FIGS. 1 and 2 show schematic diagrams of the data storage system of the present invention which is designated by the general reference number 10. System 10 comprises a plurality of magnetic recording disks 12. Each disk has a plurality of concentric data tracks. Disks 12 are mounted on a spindle motor shaft 14, which is connected to a spindle motor 16. Motor 16 is mounted to a chassis 18. The disks 12, spindle 14, and motor 16 comprise a disk stack assembly.

A plurality of read/write heads 30 are positioned over the disks 12 such that each surface of the disks 12 have a corresponding head 30. Each head 30 is attached to one of a plurality of suspensions 32 which in turn are attached to a plurality of actuator arms 34. Arms 34 are connected to a rotary actuator 36. Actuator 36 moves the heads in a radial direction across disks 12. Actuator 36 typically comprises a rotating member 38 mounted to a rotating bearing 40, a motor winding 42, and motor magnetics 44. Actuator 36 is also mounted to chassis 18. Although a rotary actuator is shown in the preferred embodiment, a linear actuator could also be used. The heads 30, suspensions 32, arms 34, and actuator arm 36 comprise an actuator assembly 46. The disk stack assembly 22 and the actuator assembly 46 are sealed in an enclosure 48 (shown by dashed line) which provides protection from particulate contamination.

A controller unit 50 provides overall control to system 10. Controller unit 50 typically contains a central processing unit (CPU), memory unit, and other digital circuitry. Controller 50 is connected to an actuator control/drive unit 56 which in turn is connected to actuator 36. This allows controller 50 to control the movement of heads 30 over disks 12. The controller 50 is connected to a read/write channel 58 which in turn is connected to the heads 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 70 may send digital data to controller 50 to be stored on disks 12 or may request that digital data be read from the disks 12 and sent to the system 70. The basic operation of DASD units is well known in the art and is described in more detail in "Magnetic Recording Handbook", C. Dennis Mee and Eric D. Daniel, McGraw Hill Book Company, 1990.

Figure 3:
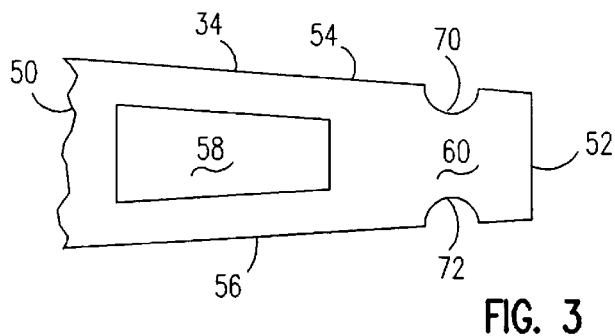
FIG. 3 is a top view of an actuator arm.

FIG. 3 is a top view of an actuator arm 34. Actuator arm 34 is made of a strong rigid material such as aluminum and has a thickness range of between 0.3 mm and 1.0 mm. Arm 34 is gently tapered from a support end 50 to a distal end 52. Arm 34 has side surfaces 54 and 56. Arm 34 is typically in the range of 3 mm to 10 mm in width, and 15 mm to 35 mm in length. The arm 34 has a through aperture 58 which helps to reduce the mass of the actuator arm 34. Arm 34 has a flat planar surface area 60 proximate distal end 52. Side edge 54 has a notch or recess portion 70 in its side surface and side edge 56 has a recess 72 in its side surface. Recesses 70 and 72 are preferably semicircular or v-shaped and have dimensions of 0.5 mm to 2.0 mm in length (longitudinal direction along arm 34) and 0.3 mm to 1.0 mm in width (lateral direction along arm 34).

Figure 4:
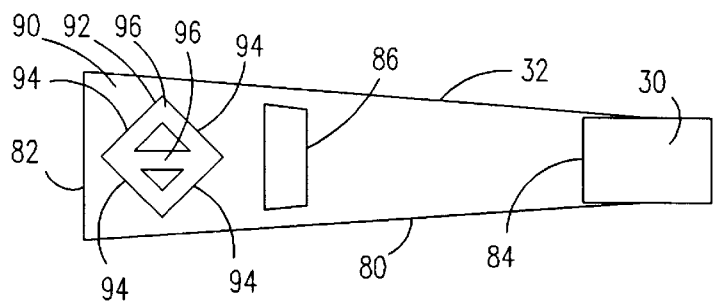
FIG. 4 is a bottom view of a suspension.

FIG. 4 is a bottom view of a suspension/head assembly or head gimbal assembly (HGA) 80. HGA 80 comprises suspension 32 and head 30. The suspension 32 typically comprises a planar member made of a rigid material such as stainless steel having a thickness of between 0.025 mm and 0.200 mm. The suspension may be comprised of one material thickness or an assembly of three different material elements known as the load beam, mounting plate and flexure. The suspension 32 is tapered from a rear end 82 to a distal end 84. The width of the suspension 32 is typically between 2.5 mm and 6.0 mm and the length is typically between 10 mm and 25 mm. Distal end 84 supports the head 30. Suspension 32 may have a through aperture 86 which creates a spring area to allow the suspension 32 to bend towards the surface of the disk. This bending provides the load force required to hold the head at the proper flying height above the disk.

Suspension 32 has a flat planar rear area 90 proximate rear end 82. Area 90 has a plurality of depressions or troughs 92 which are formed by etching the surface of area 90. These depressions are between 0.005 mm and 0.020 mm in depth and between 0.10 mm and 0.50 mm in width. Alternative to etching, the depressions may be produced by a stamping or coining process which uses a tooling die to form the pattern.

The depressions 92 comprise a plurality of depressions 94 which run in a generally lateral direction across the suspension 32 and at least one depression 96 which runs in a substantially longitudinal direction across suspension 32. All of depressions 94 and 96 are connected with one another. The depressions are arranged in a pattern such that they comprise a substantial portion of the rear area 90 of the suspension.

A liquid adhesive can wick a distance of between 2 mm and 6 mm from the depressions 92. To cover most of area 90 of suspension 32 with adhesive, the depressions 92 should be no further apart than twice the wicking distance.

Figure 5:
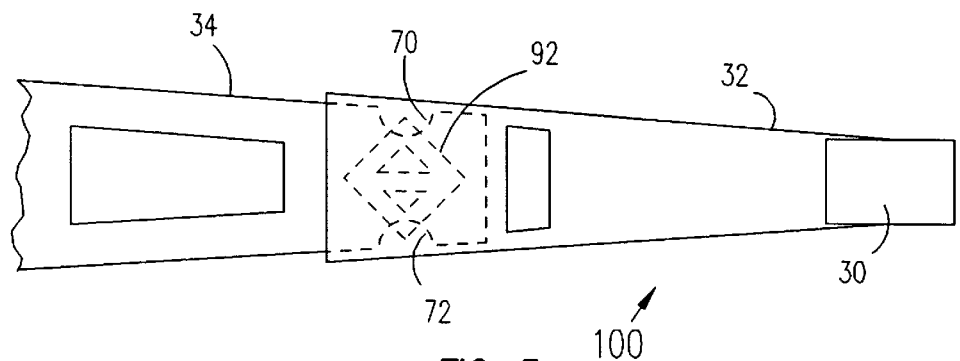
FIG. 5 is a top view of an arm/suspension assembly.
Figure 6:
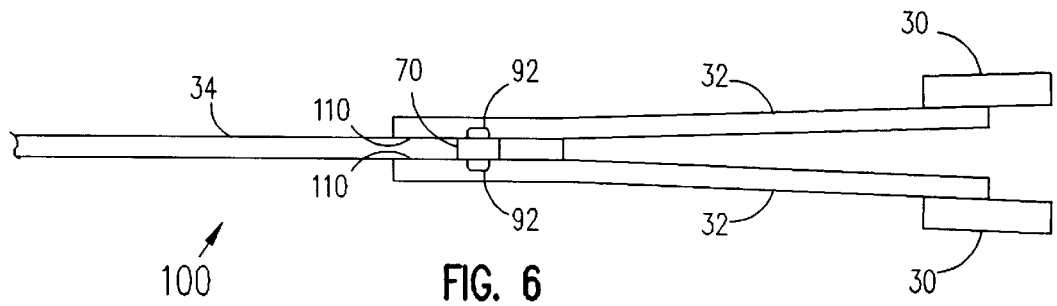
FIG. 6 is a side view of the assembly of FIG. 5.

FIGS. 5 and 6 show, respectively a top and side view of an arm/suspension assembly 100. During manufacture, the arm 34 is turned vertically such that notch 70 is located along its top surface. Two suspensions 32 (only one of which is shown in FIG. 5) are positioned next to arm 34 such that rear area 90 of suspension 32 abuts surface area 60 of arm 34. The depressions 92 are aligned such that a portion of one of the depressions 92 intersects with the notch 70 and the notch 72.

A liquid adhesive is dispensed into notch 70. A preferred adhesive is a cyanoacrylate adhesive, such as Loctite, Blackmax 380 or 4210. The depressions 92 form passageways for the adhesive. The adhesive is drawn by force of gravity into the depressions 92. The depressions 92 act as capillaries to draw the adhesive into the passageways and uniformly distribute the adhesive about surface 90 of the suspension 32. The adhesive is then wicked into the space between the suspensions 32 and arm 34.

The adhesive is then time cured and forms an adhesive layer 110 between suspensions 32 and arm 34.

It is possible that the adhesive dispensed into notch 70 may not penetrate to the bottom reaches of depression 92. In such a case, the arm 34 may be rotated such that notch 72 and surface 56 are now along the top edge of the arm 34. Additional adhesive may then be dispensed into notch 72 and drawn by gravity into the unfilled portions of depression 92. The results will be complete coverage of the adhesive in all areas of the depressions 92.

Figure 7:
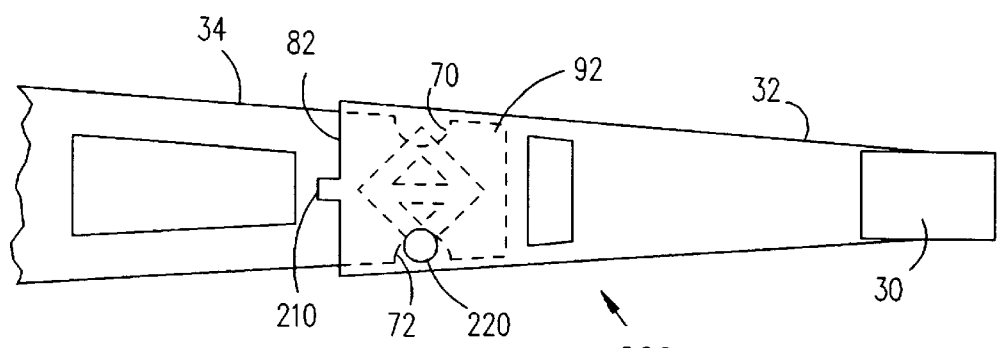
FIG. 7 is a top view of an alternative embodiment of an arm/suspension assembly.
Figure 8:
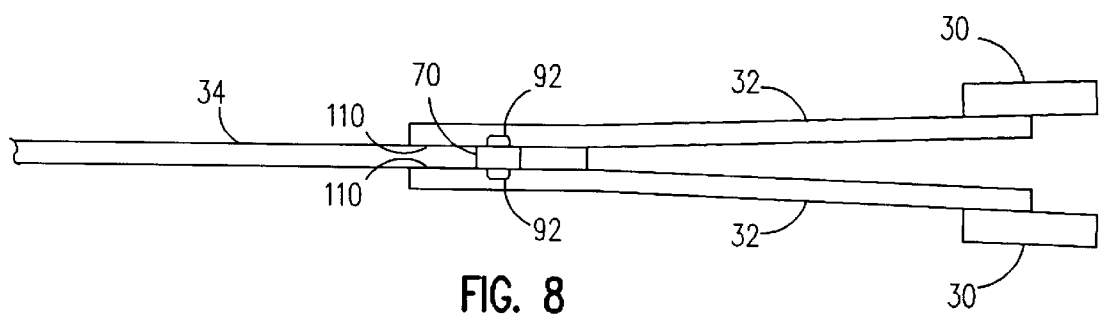
FIG. 8 is a side view of the assembly of FIG. 7.

FIGS. 7 and 8 show a top and side view, respectively, of an alternative embodiment of an arm/suspension assembly 200. Assembly 200 is similar to assembly 100, except for the addition of an electrical contact member 210 and a view window 220. Contact member 210 is a tab member which extends from the rear end 82 of suspension 32. This member 210 is bent toward arm 34 such that it remains in electrical contact with arm 34. The adhesive layer 110 between arm 34 and suspension 32 may act as an electrical insulator. For purposes of electrostatic discharge protection of the head 30, it is desirable to maintain electrical grounding between suspensions 32 and arm 34. Tab member 210 accomplishes this task.

View window 220 is an apperture through hole located in the rear area 90 of suspension 32. It is positioned to intersect with a portion of the depressions 92, at a location which is at an opposite end of the depressions 92 from the notch 70. When the adhesive is dispensed to notch 70, window 220 provides a visual verification that the adhesive has flowed to all portions of depressions 92. If the adhesive has not reached window 220, then the manufacturer may want to allow more time for the adhesive to flow completely to all parts of the depressions 92. Alternatively, it may be necessary to add more adhesive to notch 70.

Figure 9:
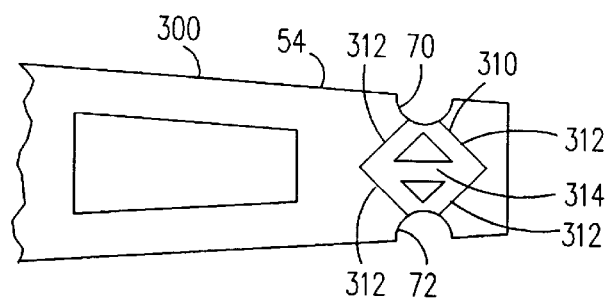
FIG. 9 is a top view of an alternative embodiment of an actuator arm.

FIG. 9 is a top view of an alternative embodiment of an actuator arm and is designated by the general reference number 300. Arm 300 is similar to arm 34, except that it contains etched (or formed or machined) depressions 310 in planar area 60. The depressions 310 are of a depth of between 0.005 mm and 0.020 mm and a width of between 0.10 mm and 0.50 mm. There are a plurality of substantially laterally running depressions 312 and at least one substantially longitudinal running depression 314. All depressions 310 are interconnected. At least one portion of depression 310 is connected to notch 70. The manufacturer of the arm/suspension assembly using arm 300 is similar to that described for arm/suspension assembly 100. The difference is that the depressions are now in the arm 300 instead of the suspension 32.

While the preferred embodiments of the present invention have been illustrated in detail, it should be apparent that modifications and adaptations to those embodiments may occur to one skilled in the art without departing from the scope of the present invention as set forth in the following claims.

We claim:

1. A suspension system comprising:
    an actuator arm having a top and bottom planar surfaces and a first and a second side surfaces, the first side surface having a recess portion;

a suspension member having a top and bottom planar surfaces and a first and a second side surfaces, the bottom planar surface of the suspension member located above the top planar surface of the actuator arm;

a passageway located between the actuator arm and the suspension member, the passageway being intersected with the recess portion; and an adhesive material located in the recess portion and the passageway.

2. The system of claim 1, wherein the passageway is formed from depressions in the bottom planar surface of the suspension member.

3. The system of claim 1, wherein the passageway is formed from depressions in the top planar surface of the actuator arm.

4. The system of claim 1, wherein the adhesive is a cyanoacrylate.

5. The system of claim 1, wherein the passageway comprises a plurality of passages running in a substantially lateral and longitudinal direction through the suspension.

6. The system of claim 1, wherein the suspension has a through aperture from its top surface to its bottom surface which intersects the passageway.

7. The system of claim 6, wherein the through aperture intersects with the passageway at the opposite end of the passageway from the recess portion.

8. A storage system comprising:

a data storage media;

a device for moving the media;

an actuator arm having a top and bottom planar surfaces and a first and a second side surfaces, the first side surface having a recess portion;

a suspension member having a top and a bottom planar surface and a first and a second side surfaces, the bottom planar surface of the suspension member located above the top planar surface of the actuator arm;

a passageway located between the actuator arm and the suspension member, the passageway being interconnected with the recess portion;

an adhesive material located in the recess portion and the passageway;

a transducer head attached to a distal end of the suspension; and an actuator connected to the actuator arm for moving the head relative to the media.

9. The system of claim 8, wherein the passageway is formed from depressions in the suspension member.

10. The system of claim 8, wherein the passageway is formed from depressions in the actuator arm.

11. The system of claim 8, wherein the adhesive is a cyanoacrylate.

12. The system of claim 8, wherein the passageway comprises a plurality of passages running in a substantially lateral and longitudinal direction through the suspension.

13. The system of claim 8, wherein the suspension has a through aperture from its top surface to its bottom surface which intersects the passageway.

14. The system of claim 13, wherein the through aperture intersects with the passageway at the opposite end of the passageway from the recess portion.

15. A method of making a transducer suspension system comprising the steps of:

positioning an actuator arm having a top and bottom planar surfaces and a first and a second side surfaces, the first side surface having a recess portion;

placing a suspension member next to the actuator arm, the suspension member having a top and bottom planar surfaces and a first and a second side surfaces, the bottom planar surface of the suspension member located above the top planar surface of the actuator arm, a passageway located between the actuator arm and the suspension member, the passageway being interconnected with the recess portion;

placing a liquid adhesive in the recess portion such that the adhesive flows into the passageway;

curing the adhesive such that the suspension is bonded to the actuator arm.

16. The system of claim 15, wherein the passageway is formed from depressions in the suspension member.

17. The system of claim 15, wherein the passageway is formed from depressions in the actuator arm.

18. The system of claim 15, wherein the adhesive is a cyanoacrylate.

19. The system of claim 15, wherein the passageway comprises a plurality of passages running in a substantially lateral and longitudinal direction through the suspension.

20. The system of claim 15, wherein the suspension has a through aperture from its top surface to its bottom surface which intersects the passageway.

21. The system of claim 20, wherein the through aperture intersects with the passageway at the opposite end of the passageway from the recess portion.

* * * * *